United States Patent
Kats et al.

(10) Patent No.: US 11,030,342 B1
(45) Date of Patent: Jun. 8, 2021

(54) SYSTEMS AND METHODS FOR CONTROLLING UPLOADING OF POTENTIALLY SENSITIVE INFORMATION TO THE INTERNET

(71) Applicant: Symantec Corporation, Mountain View, CA (US)

(72) Inventors: Daniel Kats, Culver City, CA (US); David Silva, Dublin (IE); Petros Efstathopoulos, Los Angeles, CA (US); Daniel Marino, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 165 days.

(21) Appl. No.: 16/230,727

(22) Filed: Dec. 21, 2018

(51) Int. Cl.
*G06F 9/44* (2018.01)
*G06F 21/62* (2013.01)
*H04L 29/06* (2006.01)
*H04L 29/08* (2006.01)

(52) U.S. Cl.
CPC ...... *G06F 21/6263* (2013.01); *H04L 63/0442* (2013.01); *H04L 63/10* (2013.01); *H04L 67/02* (2013.01)

(58) Field of Classification Search
CPC . G06F 21/6263; H04L 63/0442; H04L 63/10; H04L 67/02
USPC .......................................................... 726/26
See application file for complete search history.

(56) References Cited

U.S. PATENT DOCUMENTS

| | | | |
|---|---|---|---|
| 2008/0222628 A1* | 9/2008 | Batra .................. | G06F 9/44526 717/171 |
| 2014/0304839 A1* | 10/2014 | Hansen ............... | G06F 21/6209 726/29 |
| 2015/0199537 A1* | 7/2015 | Dykstra .............. | G06F 21/6227 713/189 |
| 2019/0087463 A1* | 3/2019 | Dua ........................ | G06F 16/93 |
| 2020/0045047 A1* | 2/2020 | Wu ...................... | H04L 63/0428 |

* cited by examiner

*Primary Examiner* — Brandon S Hoffman
*Assistant Examiner* — Nega Woldemariam
(74) *Attorney, Agent, or Firm* — FisherBroyles, LLP

(57) ABSTRACT

The disclosed computer-implemented method for controlling uploading of potentially sensitive information to the Internet may include (i) loading, at the computing device, at least a portion of a webpage and (ii) performing a security action including (A) converting, at the computing device, components of the webpage from an online status to an offline status, (B) receiving a sensitive information input to a respective offline component of the webpage, (C) converting, based on a stored user preference and in response to receiving the sensitive information input, the respective offline component to the online status, (D) buffering an outgoing network request comprising the sensitive information input, (E) receiving an approval input indicating approval to transmit the potentially sensitive information to the Internet, and (F) releasing the outgoing network request in response to receiving the approval input. Various other methods, systems, and computer-readable media are also disclosed.

20 Claims, 7 Drawing Sheets

SYSTEMS AND METHODS FOR CONTROLLING UPLOADING OF POTENTIALLY SENSITIVE INFORMATION TO THE INTERNET

BACKGROUND

When interacting with webpages and applications, users may provide personal information that may be sent, without the users' knowledge or permission, to other computers that are beyond the users' control. For example, while filling out forms on webpages, users may enter personal information, reconsider using the forms, and stop entering personal information midway through the forms. Some websites send the limited quantities of personal information that are entered to other computers that are beyond the users' control. Some of the personal information that might be transferred without user knowledge or control may include identity verification information, birth dates, social security numbers, banking information, credit card numbers, passwords, citizenship information, marital status, and/or employment status. Additionally, applications and webpages providing photo filters to convert and display user-provided photos may send the input photos to other computers that are beyond the users' control. Thus, though users may not intend to send the personal information, the websites and applications send the personal information anyway. Further, in some cases, users may never know that their personal information has been sent and may be forever out of the users' control. The instant disclosure, therefore, identifies and addresses a need for systems and methods for controlling uploading of potentially sensitive information to the internet.

SUMMARY

As will be described in greater detail below, the instant disclosure describes various systems and methods for controlling uploading of potentially sensitive information to the internet.

In one example, a method for controlling uploading of potentially sensitive information to the internet may include (i) loading, at the computing device, at least a portion of a webpage and (ii) performing a security action including (A) converting, at the computing device, components of the webpage from an online status to an offline status, (B) receiving a sensitive information input to a respective offline component of the webpage, (C) converting, based on a stored user preference and in response to receiving the sensitive information input, the respective offline component to the online status, (D) buffering an outgoing network request including the sensitive information input, (E) receiving an approval input indicating approval to transmit the potentially sensitive information to the Internet, and/or (F) releasing the outgoing network request in response to receiving the approval input.

In some examples, the converting components may include (i) detecting when the webpage has substantially finished loading and/or (ii) initiating performing the converting in response to the detecting. In some embodiments, converting components of a webpage from an online status to an offline status may be performed by at least one of a browser extension, an operating system, and an application.

In an example, the webpage may include at least one of (i) a quick response code reader, (ii) a file encryption application, (iii) an encrypted messaging application, (iv) an address book uploading application, (v) an online code editor, (vi) a visual editor, (vii) a form, (viii) a photo processing application, (ix) a photo filter application, (x) a network permissions setting, and/or (xi) a password manager.

In an embodiment, the method may include identifying object tags in the webpage to identify field components of the webpage requesting entry of the potentially sensitive information. In some examples, the method may include temporarily blocking Internet access by the webpage in response to identifying the field components of the webpage requesting entry of the potentially sensitive information.

In some embodiments, the method may include converting the respective offline component to a user interface widget. In an example, the method may include displaying a padlock image substantially near an image of the respective offline component. In an embodiment, the method may include displaying an image of the respective offline component in a color contrasting with a color of a substantially adjacent component of the webpage.

In some examples, the method may include (i) identifying online and offline components of the webpage and/or (ii) displaying at least one identifier indicating which components of the webpage are online. In some embodiments, the method may include (i) marking an additional component of the webpage as for offline information only and/or (ii) blocking sensitive information entered into the additional component from being sent to the Internet.

In an example, the method may include, in response to the receiving the sensitive information input (i) generating a public-private key pair and/or (ii) encrypting the sensitive information input with the public-private key pair, where the sensitive information input must be encrypted prior to releasing the outgoing network request.

In an embodiment, the method may include detecting a type of action that the network request is performing. In some embodiments, the method may include passing the sensitive information input from an offline thread to an online thread in response to receiving the approval input. In an example, the method may include requesting, via a graphical user interface displayed on a display device, the approval input.

In one embodiment, a system for controlling uploading of potentially sensitive information to the internet may include at least one physical processor and physical memory that includes computer-executable instructions that, when executed by the physical processor, cause the physical processor to (i) load, at the system, at least a portion of a webpage and/or (ii) perform a security action including (A) converting, at the computing device, components of the webpage from an online status to an offline status, (B) receiving a sensitive information input to a respective offline component of the webpage, (C) converting, based on a stored user preference and in response to receiving the sensitive information input, the respective offline component to the online status, (D) buffering an outgoing network request including the sensitive information input, (E) receiving an approval input indicating approval to transmit the potentially sensitive information to the Internet, and/or (F) releasing the outgoing network request in response to receiving the approval input.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) load, at the computing device, at least a portion of a webpage and/or (ii) perform a security action including (A) converting, at the computing device, components of the webpage from an online status to an offline status, (B) receiving a sensitive information input to a respective offline component of the webpage, (C) converting, based on a stored user preference and in response to receiving the sensitive information input, the respective offline component to the online status, (D) buffering an outgoing network request including the sensitive information input, (E) receiving an approval input indicating approval to transmit the potentially sensitive information to the Internet, and/or (F) releasing the outgoing network request in response to receiving the approval input.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
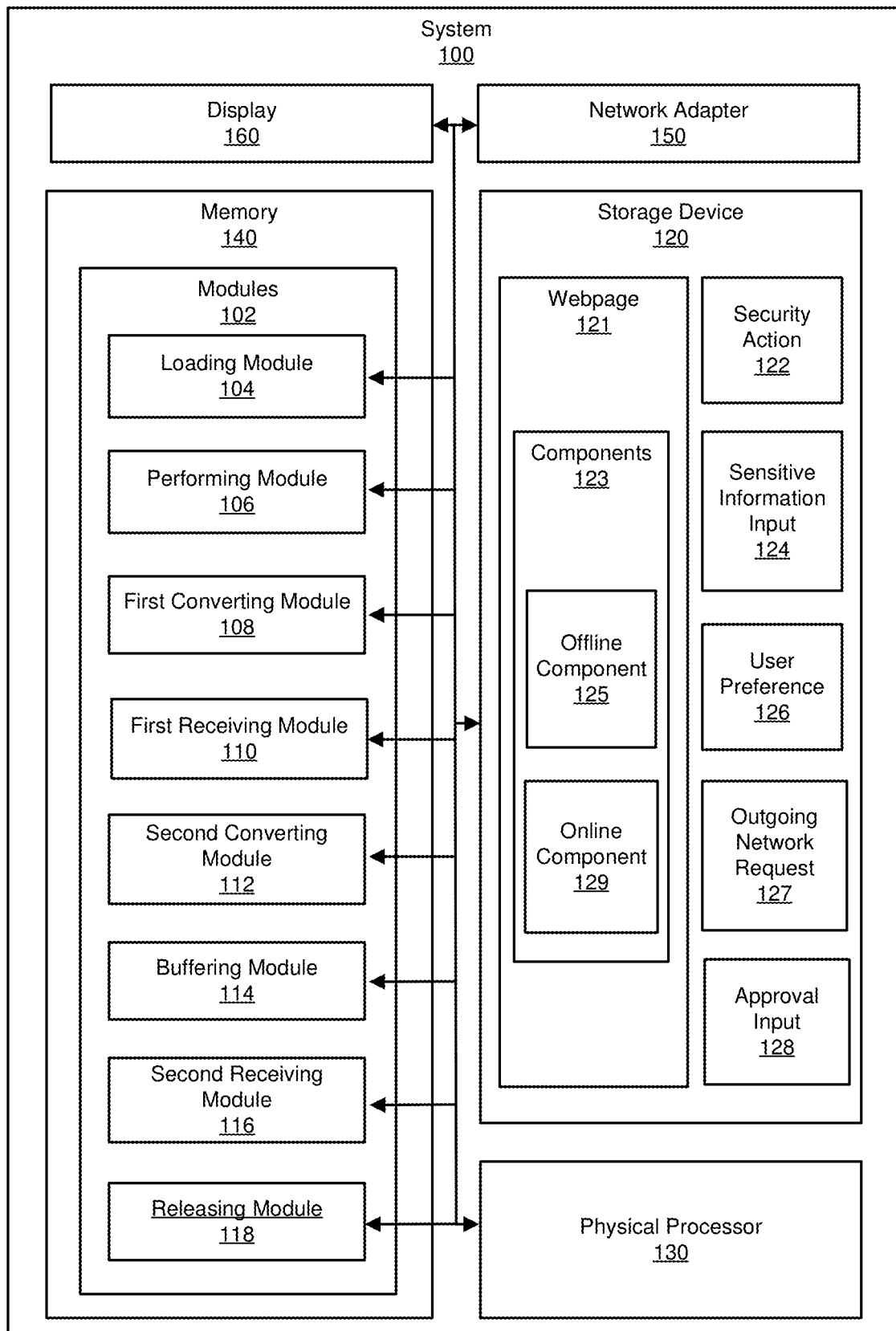
FIG. 1 is a block diagram of an example system for controlling uploading of potentially sensitive information to the internet.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for controlling uploading of potentially sensitive information to the internet.

Many modern application platforms such as desktop computing devices, mobile computing devices, and Internet-accessing devices do not distinguish between components that have access to the Internet and components that do not have access to the Internet. While it may sometimes be possible to limit the Internet access of a particular application (e.g., through firewall tools, browser extensions, etc.), traditional techniques do not determine which portions of applications may interact with the Internet. These traditional all-or-nothing approaches to network access result in users never being sure whether a specific piece of sensitive information they have entered may be sent to servers via the Internet.

Traditional approaches have led to numerous privacy leaks and several well-known malicious attacks. For example, faulty password manager and browser-level auto-fill attacks may allow websites to harvest credentials. Further, applications may send far more data than expected, which may enable creating user profiles that malicious actors may sell. Other examples include barcode code readers (e.g., QR code readers) that may read sensitive data and store the sensitive data on remote servers without user permission and/or user control. Moreover, conventional techniques may not guarantee that applications and/or webpages are performing client-side encryption prior to sending sensitive information and/or passwords via the Internet. In some cases, conventional techniques may send passwords via the Internet in plain text form.

The present disclosure is generally directed to mitigating these concerns by providing systems and methods for controlling uploading of potentially sensitive information to the internet. In some examples, provided are offline execution environments that enable applications and/or webpages to process user information locally while not allowing the user information to leave the user computer device without user approval for online communication. In some embodiments, the provided techniques may be provided by operating systems, applications, web browser extensions, plug-ins, mobile device software, the like, or a combination thereof. In some embodiments, the provided techniques may be provided with or without permission of developers of related software. In some examples, provided are techniques that expose actions of contravening applications to users.

In some embodiments, provided techniques may empower application developers to distinguish between offline and online components of applications (e.g., by identifying which components are offline only components). In some examples, provided techniques may provide tools to detect accidental privacy leakage (e.g., applications will not work when offline components are accessed by online components). Further, splitting trust between applications developers, operating system developers, and browser developers may provide users with confidence that applications function with minimal (if any) privacy leakage. Also, when application developers must run third-party instructions, running these instructions in offline environments may provide users with additional protections. In some embodiments, the provided techniques may enable reviewers and automatic checkers of applications and/or webpages to flag problematic applications and/or webpages as being insensitive to user privacy.

In some examples, offline execution environments may be provided in any of mobile phone applications, web browsers, and/or desktop applications. In some examples, user interfaces and/or information entry fields may have special indicators showing that certain information may not be transferred via the Internet (e.g., to servers).

In some embodiments, provided techniques may provide language-level (e.g., taint tracking) restrictions. In some examples, provided techniques may mark variables as including offline data (e.g., at the language level) and may indicate that variables that interact with marked variables may also be tainted. In some examples, these tainted variables may have access to message-passing interfaces and/or the Internet disabled.

In some examples, provided techniques may provide one-way message passing and output-only (i.e., write-only) user interface fields. For example, user interface models may provide "offline-output" fields for user interfaces, where threads in offline execution environments may write. Threads in offline execution environments may receive data from outside of the offline execution environments but may not be capable of sending data out.

In some embodiments, provided techniques may provide platform-level differential privacy or data-independent computing. Similar to cryptography, platforms may be entrusted to perform correct computation, thus "laundering" the contents into aggregate statistics which may then be used on servers. An example of this is the generation of public-private key pairs, where only the public key is extractable after the operation has completed.

In some examples, provided techniques may provide user interface widgets that are "local-read-only" and that may only be read from offline execution environments to get user input. The semantics for this in HTML might look like:

<input offline-only="true" type="file" name="picture" id="picture"/>

In some examples, to visually distinguish these elements, the elements may incorporate a padlock design (e.g., similar to the padlock design indicated when using HTTPS). In some embodiments, there may be some platform-level indicators that users are typing in an offline-only field, such as a change in the browser color (e.g., similar to the switch-over to Incognito mode/private browsing). In some examples, browser-level gadgets may be used to submit offline-only fields to online components.

By doing so, the systems and methods described herein may improve the security of computing devices and/or provide targeted protection against privacy leakage, malware, and/or malicious users. In some examples, the systems and methods described herein may advantageously help users identify online and offline components of user interfaces. In some embodiments, the systems and methods described herein may advantageously help software developers produce privacy-preserving applications. In some embodiments, the systems and methods described herein may advantageously provide taint tracking to identify locations of sensitive information during executing applications. As such, the provided techniques may advantageously protect users by beneficially reducing security risks posed by privacy leakage, malicious processes, and/or malicious users.

Figure 2:
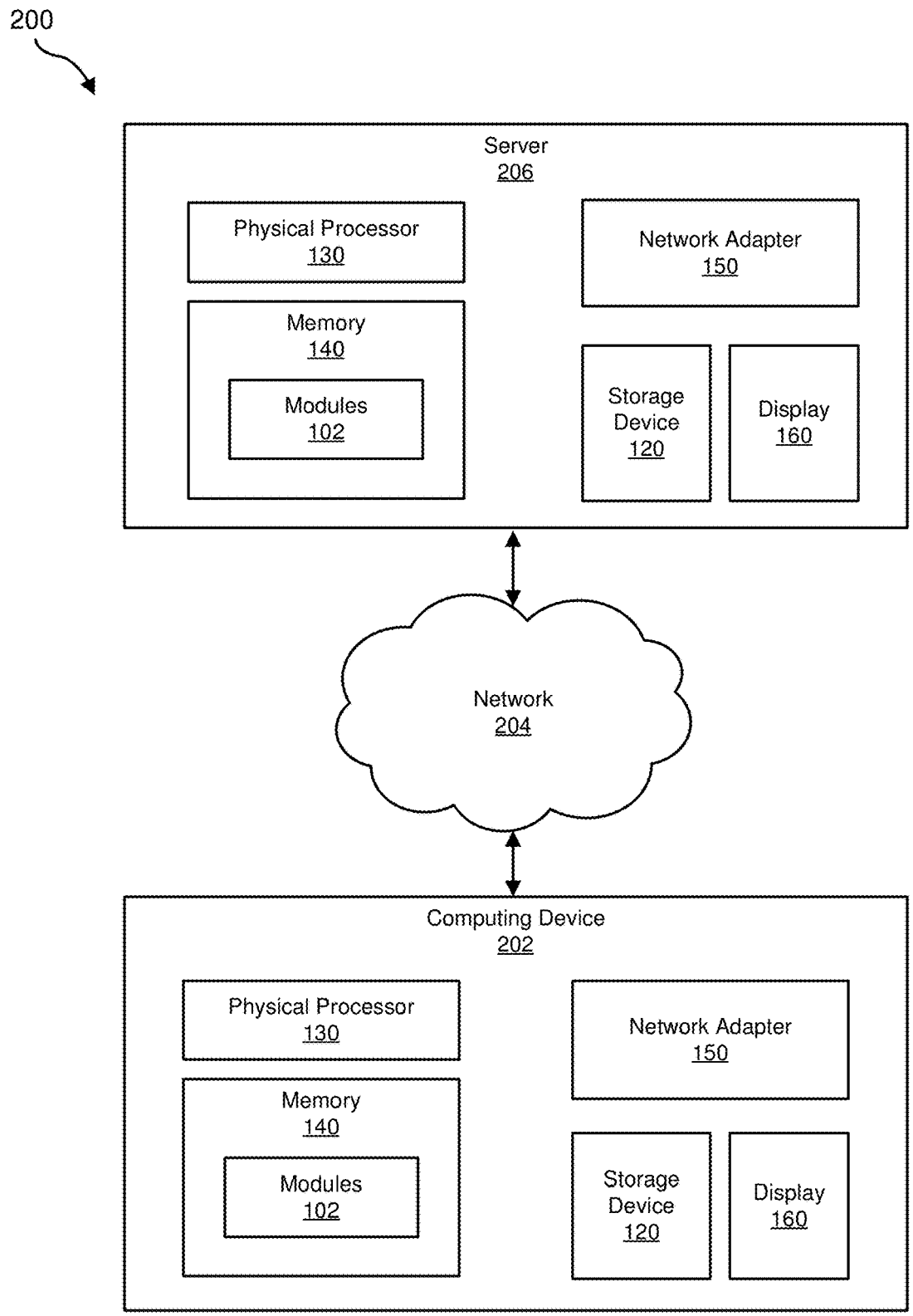
FIG. 2 is a block diagram of an additional example system for controlling uploading of potentially sensitive information to the internet.

The following will provide, with reference to FIGS. 1-2, detailed descriptions of example systems for controlling uploading of potentially sensitive information to the internet. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for controlling uploading of potentially sensitive information to the internet. As illustrated in this figure, example system 100 may include one or more modules 102 for performing one or more tasks. As will be explained in greater detail below, modules 102 may include a loading module 104, a performing module 106, a first converting module 108, a first receiving module 110, a second converting module 112, a buffering module 114, a second receiving module 116, and/or a releasing module 118. Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of a webpage 121, a security action 122, components 123 of a webpage (e.g., webpage 121), a sensitive information input 124, an offline component 125 (e.g., of a webpage), a user preference 126 (e.g., for automatically converting an offline component to an online component in response to receiving a sensitive information input or not automatically converting an offline component to an online component in response to receiving a sensitive information input), an outgoing network request 127, an approval input 128 (e.g., indicating approval to transmit potentially sensitive information to and/or via the Internet), and/or an online component 129 (e.g., of a webpage). In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate controlling uploading of potentially sensitive information to the internet. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2).

As illustrated in FIG. 1, example system 100 may also include one or more display devices, such as display 160. Display 160 generally represents any type or form of device capable of visually displaying information (e.g., to a user). In some examples, display 160 may present a graphical user interface. In non-limiting examples, display 160 may present at least a portion of information indicating one or more of webpage 121, security action 122, components 123, sensitive information input 124, offline component 125, user preference 126, outgoing network request 127, approval input 128, and/or online component 129.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to control uploading of potentially sensitive information to the Internet. For example, and as will be described in greater detail below, one or more of modules 102 may cause computing device 202 and/or server 206 to (i) load at least a portion of webpage 121 and (ii) perform security action 122 including (A) converting components of webpage 121 from an online status to an offline status, (B) receiving sensitive information input 124 to respective offline component 125 of webpage 121, (C) converting, based on stored user preference 126 and in response to receiving sensitive information input 124, respective offline component 125 to the online status, (D) buffering outgoing network request 127 including sensitive information input 124, (E) receiving approval input 128 indicating approval to transmit potentially sensitive information 124 to the Internet, and (F) releasing outgoing network request 127 in response to receiving approval input 128.

Computing device 202 generally represents any type or form of computing device capable of reading computer-executable instructions. In some examples, computing device 202 may represent a computer running security software, such as privacy software. Additional examples of computing device 202 include, without limitation, laptops, tablets, desktops, servers, mobile devices, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, server 206 may represent a computer running security software, such as privacy software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
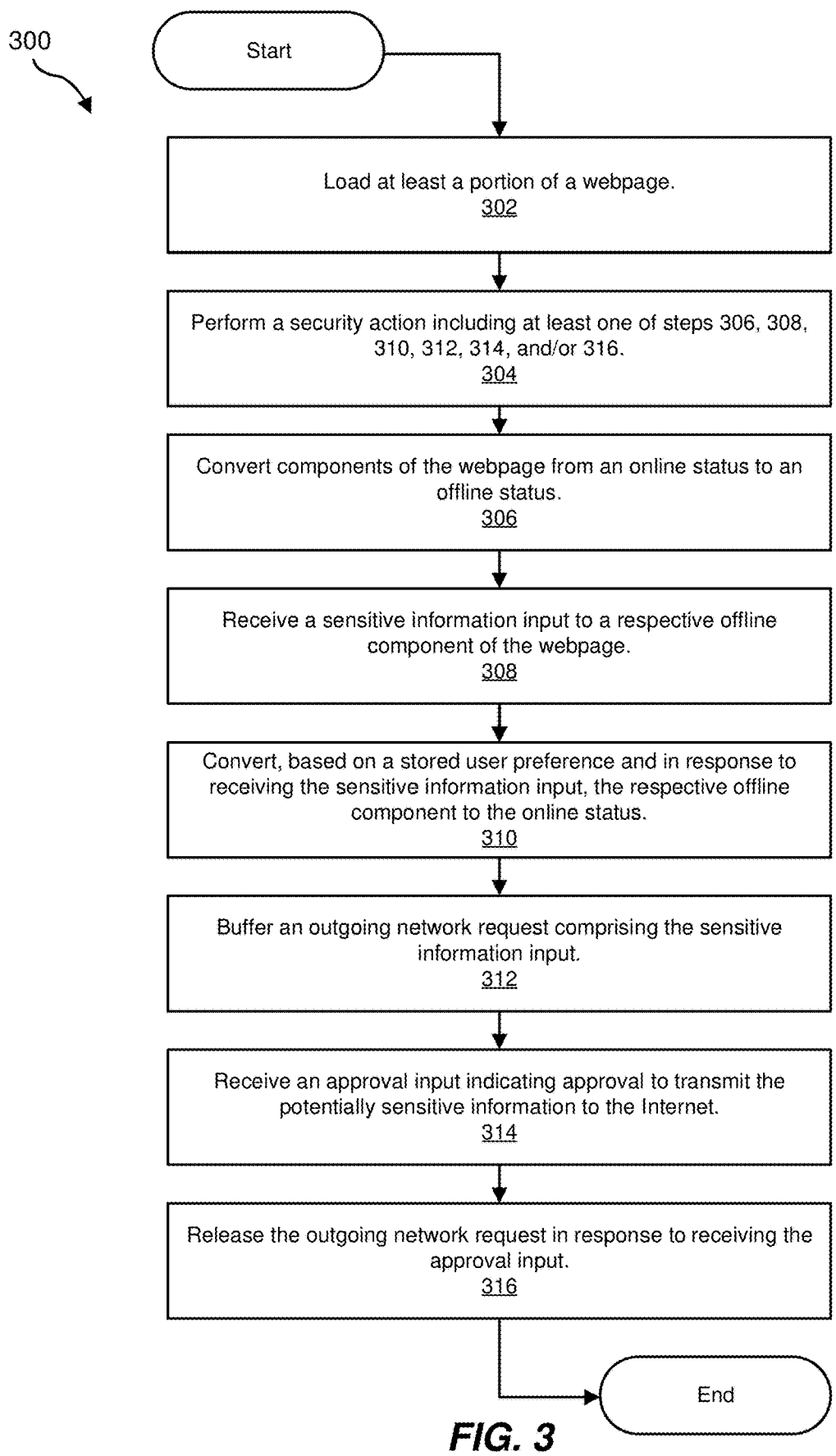
FIG. 3 is a flow diagram of an example method for controlling uploading of potentially sensitive information to the internet.

FIG. 3 is a flow diagram of an example computer-implemented method 300 for controlling uploading of potentially sensitive information to the internet. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below. In some examples, techniques applicable to websites may be applied to applications to control uploading of potentially sensitive information to the Internet.

As illustrated in FIG. 3, at step 302 one or more of the systems described herein may load (e.g., at a computing device), at least a portion of webpages and/or applications. The systems described herein may perform step 302 in a variety of ways. For example, loading module 104 may, as part of computing device 202 in FIG. 2, load at least a portion of webpage 121.

In some examples, the webpage may include at least one of (i) a quick response code reader, (ii) a file encryption application, (iii) an encrypted messaging application, (iv) an address book uploading application, (v) an online code editor, (vi) a visual editor, (vii) a form, (viii) a photo processing application, (ix) a photo filter application, (x) a network permissions setting, and/or (11) a password manager.

As illustrated in FIG. 3, at step 304 one or more of the systems described herein may perform security actions (e.g., including at least one of steps 306, 308, 310, 312, 314, and/or 316). The systems described herein may perform step 304 in a variety of ways. For example, performing module 106 may, as part of computing device 202 in FIG. 2, perform security action 122.

In examples, security actions may include prophylactic measures taken to safeguard electronic information. Prophylactic measures may include acts undertaken to prevent, detect, and/or mitigate vulnerabilities of electronic computing devices, to implement computer security policies (e.g., detecting privacy leakage), to detect malicious activities on electronic computing devices, and/or to thwart malicious activities on electronic computing devices.

In some examples, method 300 may further include performing at least one security action in response to detecting privacy leakage, detecting vulnerabilities of electronic computing devices, detecting potential security risks directed toward the electronic computing devices, detecting malicious activity directed toward the electronic computing devices, or a combination thereof. In some examples, security actions may be performed in an attempt to ameliorate potential security risks. For example, performing modules may identify potential security risks and in response performing modules may perform security actions in attempts to ameliorate the potential security risks. Security actions may include pausing and/or stopping acts by users and/or autonomous processes executing on computers.

Security actions may also include notifying users of potential security risks (e.g., via graphical user interfaces depicted on displays). In some examples, security actions may include preventing data entry into user interfaces and/or displaying warnings on user displays. In additional examples, the security actions may include displaying, on user displays, warnings indicating that user approval is required to upload sensitive information to the Internet.

As illustrated in FIG. 3, at step 306 one or more of the systems described herein may convert components of the webpages and/or the applications from an online status to an offline status. The systems described herein may perform step 306 in a variety of ways. For example, first converting module 108 may, as part of computing device 202 in FIG. 2, convert components of webpage 121 from an online status to an offline status.

In some examples, the converting components of the webpage and/or application from the online status to the offline status may include (i) detecting when the webpage and/or an application has substantially finished loading and/or (ii) initiating performing the converting in response to the detecting. Fields on the webpage and attribute names may be identified, such as by natural language interpretation of the attribute names.

In some embodiments, converting components of the webpage from the online status to the offline status may be performed by at least one of a browser extension, an operating system, and/or an application.

As illustrated in FIG. 3, at step 308 one or more of the systems described herein may receive sensitive information inputs to respective offline components of the webpages and/or applications. The systems described herein may perform step 308 in a variety of ways. For example, first receiving module 110 may, as part of computing device 202 in FIG. 2, receive sensitive information input 124 to respective offline component 125 of webpage 121.

In some embodiments, method 300 may include identifying object tags in the webpage and/or application to identify field components of the webpage and/or application requesting entry of the potentially sensitive information. In some examples, method 300 may include temporarily blocking Internet access by the webpage and/or application in response to identifying the field components of the webpage and/or application requesting entry of the potentially sensitive information.

In some examples, method 300 may include requesting, via a graphical user interface displayed on a display device, the sensitive information input.

In some embodiments, method 300 may include converting the respective offline component to a user interface widget.

In an example, method 300 may include displaying a padlock image substantially near an image of the respective offline component. In an embodiment, method 300 may include displaying an image of the respective offline component in a color contrasting with a color of a substantially adjacent component of the webpage and/or user interface.

In some examples, method 300 may include (i) identifying online and offline components of the webpage and/or (ii) displaying at least one identifier indicating which components of the webpage are online.

In some embodiments, method 300 may include (i) marking an additional component of the webpage as for offline information only and/or (ii) blocking sensitive information entered into the additional component from being sent to the Internet.

In an example, method 300 may include, in response to the receiving the sensitive information input (i) generating a public-private key pair and/or (ii) encrypting the sensitive information input with the public-private key pair. In some embodiments, the sensitive information input must be encrypted prior to releasing the outgoing network request. In some examples, users may approve releases of sensitive information only after the sensitive information is encrypted. In some embodiments, this technique may provide users with confidence that their sensitive information is encrypted (e.g., by platforms, operating systems, browsers, the like, or a combination thereof) before being released. In some examples, this technique may advantageously provide users with confidence that their sensitive information is substantially always encrypted before being released. In an example, in encrypted messaging applications, the provided techniques may advantageously instill user confidence by releasing sensitive information only in encrypted messages.

As illustrated in FIG. 3, at step 310 one or more of the systems described herein may convert (e.g., based on a stored user preference and in response to receiving the sensitive information input) the respective offline components to the online status. The systems described herein may perform step 310 in a variety of ways. For example, second converting module 112 may, as part of computing device 202 in FIG. 2, convert, based on stored user preference 126 and in response to receiving sensitive information input 124, respective offline component 125 to the online status.

As illustrated in FIG. 3, at step 312 one or more of the systems described herein may buffer outgoing network requests including the sensitive information inputs. The systems described herein may perform step 312 in a variety of ways. For example, buffering module 114 may, as part of computing device 202 in FIG. 2, buffer outgoing network request 127 including sensitive information input 124.

In some embodiments, method 300 may include detecting a type of action that the network request is performing.

As illustrated in FIG. 3, at step 314 one or more of the systems described herein may receive approval inputs indicating approvals to transmit the potentially sensitive information to the Internet. The systems described herein may perform step 314 in a variety of ways. For example, second receiving module 116 may, as part of computing device 202 in FIG. 2, receive approval input 128 indicating approval to transmit potentially sensitive information 124 to the Internet.

In some examples, method 300 may include requesting, via a graphical user interface displayed on a display device, the approval input. In some embodiments, method 300 may include a browser and/or application providing a visual indication (e.g., via a display) that actuating an input approval image will submit sensitive information (e.g., in fields that are offline) to another computing device (e.g., via the Internet). In some examples, approval input images (e.g., buttons, drop-down boxes, file upload images, file selection images, an image, the like, or a combination thereof) may be added to webpages in locations substantially near at least some input field components of the webpages. In some embodiments, approval input images may be provided on a per-form basis. In some embodiments, approval input images may be provided on a per-website basis. In some examples, users may actuate approval input images to submit approval inputs. In some examples, failing to actuate approval input images denies (e.g., by default) submitting approval inputs. In some embodiments, approval input images may be provided to approve sending sensitive information to and/or from other applications on mobile devices. In some examples, approval input images may be provided to approve sending sensitive information to and/or from other webpages on mobile devices.

Figure 4:
FIG. 4 is a diagram of an example form on an example webpage to which the provided techniques may be applied for controlling uploading of potentially sensitive information to the internet.
Figure 5:
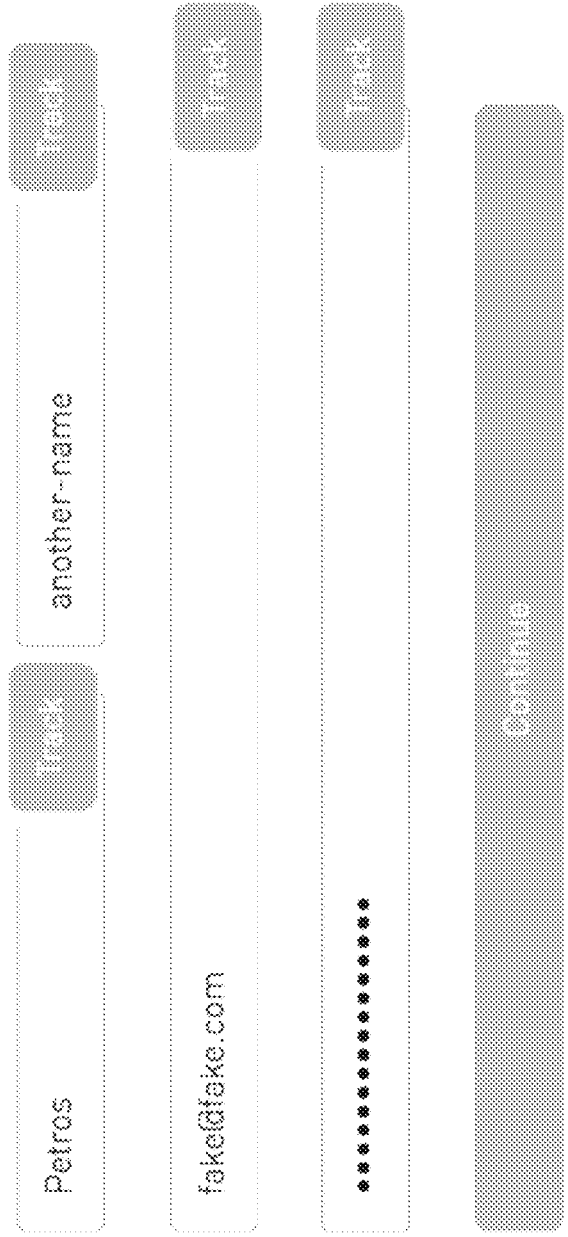
FIG. 5 is a diagram of an example form to which an example of the provided techniques is applied for controlling uploading of potentially sensitive information to the internet.

We turn now to examples in FIGS. 4-5. FIG. 4 is a diagram of an example form 400 on an example webpage to which the provided techniques may be applied for controlling uploading of potentially sensitive information to the internet. FIG. 5 is a diagram 500 of the example form 400 to which an example of the provided techniques is applied for controlling uploading of potentially sensitive information to the internet. Diagram 500 depicts results of applying at least portions of method 300 to example form 400, such as of (i) converting components of webpage from 400 an online status to an offline status, (ii) receiving sensitive information inputs to respective offline components of the webpage, and (iii) requesting, via a graphical user interface, approval input (i.e., with "Track" buttons). When users actuate approval input images, the users may submit approval inputs for sensitive information input into respective input field objects.

Returning to FIG. 3, in some embodiments, method 300 may include passing the sensitive information input from an offline thread to an online thread in response to receiving the approval input. In an example, only offline threads may read information in offline fields.

As illustrated in FIG. 3, at step 316 one or more of the systems described herein may release the outgoing network requests in response to receiving the approval inputs. The systems described herein may perform step 316 in a variety of ways. For example, releasing module 118 may, as part of computing device 202 in FIG. 2, release outgoing network request 127 in response to receiving approval input 128.

As detailed above, the steps outlined in method 300 in FIG. 3 may enable controlling uploading of potentially sensitive information to the internet. For example, the systems described herein may (i) load, at the system, at least a portion of a webpage and/or (ii) perform a security action including (A) converting, at the computing device, components of the webpage from an online status to an offline status, (B) receiving a sensitive information input to a respective offline component of the webpage, (C) converting, based on a stored user preference and in response to receiving the sensitive information input, the respective offline component to the online status, (D) buffering an outgoing network request including the sensitive information input, (E) receiving an approval input indicating approval to transmit the potentially sensitive information to the Internet, and/or (F) releasing the outgoing network request in response to receiving the approval input. By doing so, the systems and methods described herein may improve the security of computing devices and/or provide targeted protection against privacy leakage, malware, and/or malicious users.

Figure 6:
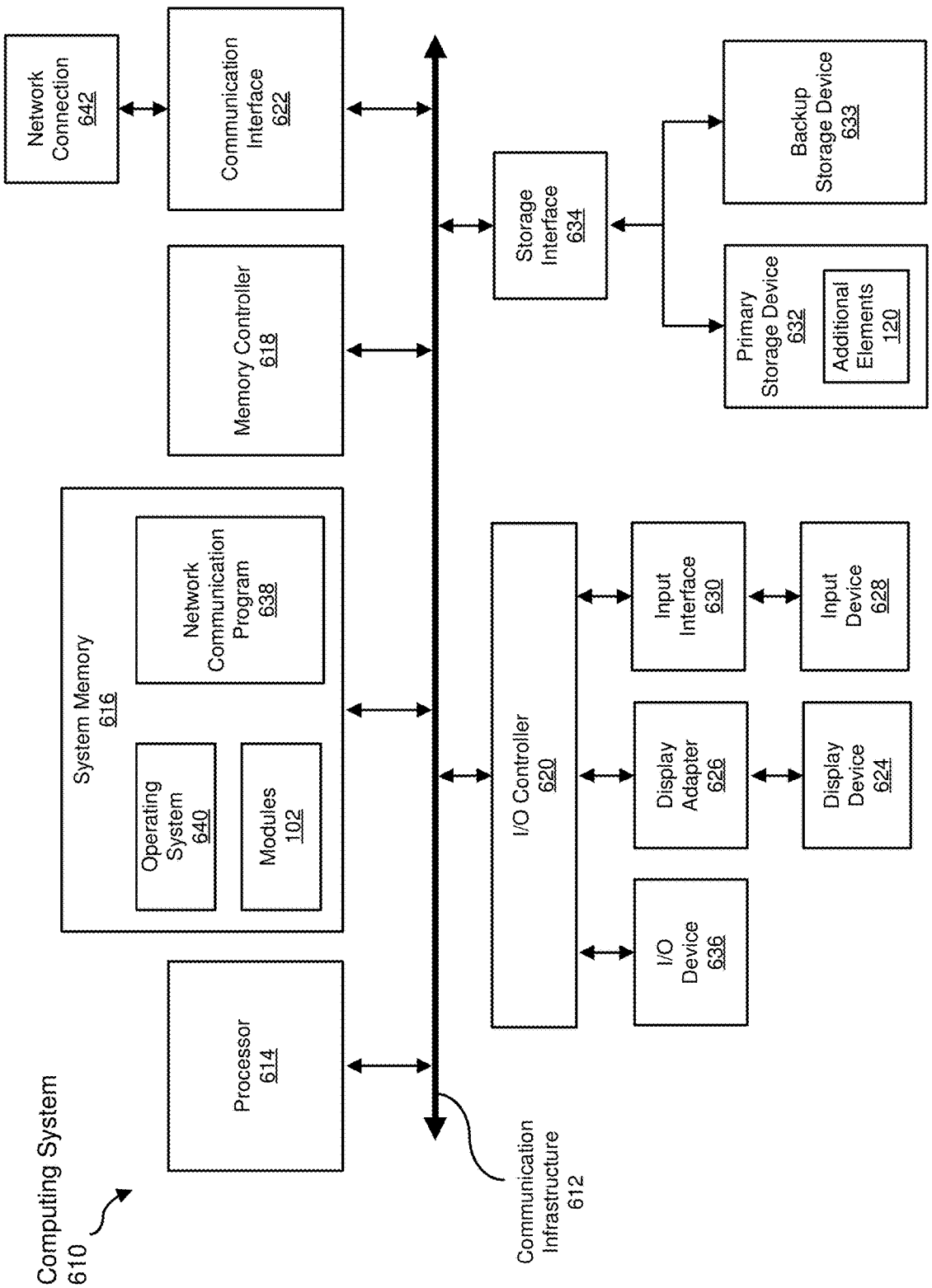
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, storage device 120 from FIG. 1 may be at least a part of primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
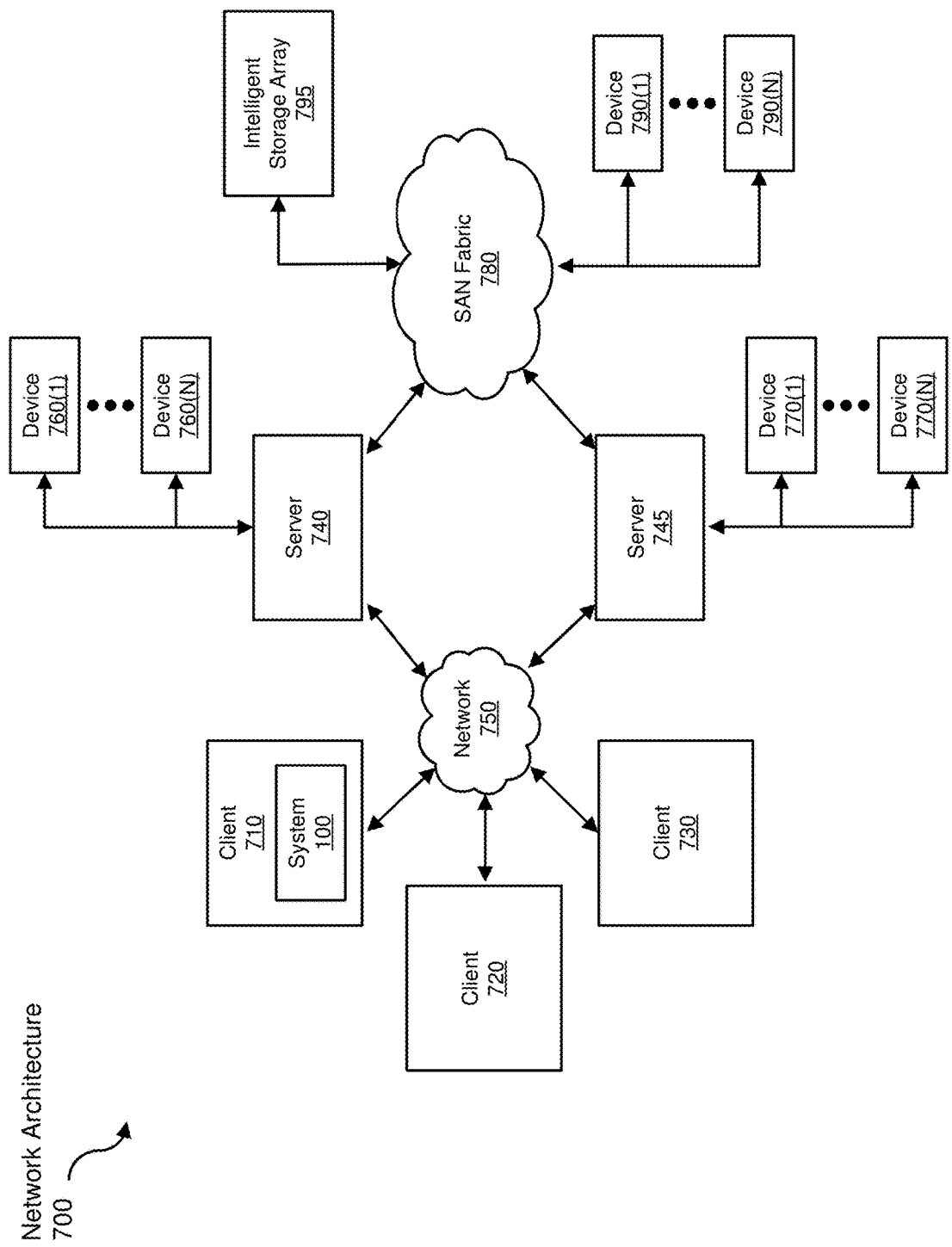
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for controlling uploading of potentially sensitive information to the Internet.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive components of a webpage to be transformed, transform the components of the webpage, output a result of the transformation to a display, use the result of the transformation to control uploading potentially sensitive information to the internet, and store the result of the transformation in a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for controlling uploading of potentially sensitive information to the Internet, at least a portion of the method being performed by a computing device comprising at least one processor, the method comprising:
    loading, at the computing device, at least a portion of a webpage; and
    performing a security action comprising:
        converting, at the computing device, components of the webpage from an online status to an offline status;
        receiving a sensitive information input to a respective offline component of the webpage;
        converting, based on a stored user preference that indicates automatically converting an offline component to the online status in response to receiving the sensitive information input, the respective offline component to the online status;
        buffering an outgoing network request comprising the sensitive information input;
        receiving an approval input indicating approval to transmit the potentially sensitive information to the Internet; and
        releasing the outgoing network request in response to receiving the approval input.

2. The computer-implemented method of claim 1, wherein converting components of a webpage from an online status to an offline status further comprises:
    detecting when the webpage has substantially finished loading; and
    initiating performing the converting in response to the detecting.

3. The computer-implemented method of claim 1, wherein converting components of a webpage from an online status to an offline status is performed by at least one of a browser extension, an operating system, and an application.

4. The computer-implemented method of claim 1, wherein the webpage comprises at least one of:
    a quick response code reader;
    a file encryption application;
    an encrypted messaging application;
    an address book uploading application;
    an online code editor;
    a visual editor;
    a form;
    a photo processing application;
    a photo filter application;
    a network permissions setting; and
    a password manager.

5. The computer-implemented method of claim 1, further comprising identifying object tags in the webpage to identify field components of the webpage requesting entry of the potentially sensitive information.

6. The computer-implemented method of claim 5, further comprising temporarily blocking Internet access by the webpage in response to identifying the field components of the webpage requesting entry of the potentially sensitive information.

7. The computer-implemented method of claim 1, further comprising converting the respective offline component to a user interface widget.

8. The computer-implemented method of claim 1, further comprising displaying a padlock image substantially near an image of the respective offline component.

9. The computer-implemented method of claim 1, further comprising displaying an image of the respective offline component in a color contrasting with a color of a substantially adjacent component of the webpage.

10. The computer-implemented method of claim 1, further comprising:
    identifying online and offline components of the webpage; and
    displaying at least one identifier indicating which components of the webpage are online.

11. The computer-implemented method of claim 1, further comprising:
    marking an additional component of the webpage as for offline information only; and
    blocking sensitive information entered into the additional component from being sent to the Internet.

12. The computer-implemented method of claim 1, further comprising, in response to the receiving the sensitive information input:
    generating a public-private key pair; and
    encrypting the sensitive information input with the public-private key pair, wherein the sensitive information input must be encrypted prior to releasing the outgoing network request.

13. The computer-implemented method of claim 1, further comprising detecting a type of action that the network request is performing.

14. The computer-implemented method of claim 1, further comprising passing the sensitive information input from an offline thread to an online thread in response to receiving the approval input.

15. The computer-implemented method of claim 1, further comprising requesting, via a graphical user interface displayed on a display device, the approval input.

16. A system for controlling uploading of potentially sensitive information to the Internet, the system comprising:
at least one physical processor;
physical memory comprising computer-executable instructions that, when executed by the physical processor, cause the physical processor to:
load, at the system, at least a portion of a webpage; and
perform a security action comprising:
converting, at the computing device, components of the webpage from an online status to an offline status;
receiving a sensitive information input to a respective offline component of the webpage;
converting, based on a stored user preference that indicates automatically converting an offline component to the online status in response to receiving the sensitive information input, the respective offline component to the online status;
buffering an outgoing network request comprising the sensitive information input;
receiving an approval input indicating approval to transmit the potentially sensitive information to the Internet; and
releasing the outgoing network request in response to receiving the approval input.

17. The system of claim 16, further comprising computer-executable instructions that, when executed by the physical processor, cause the physical processor to pass the sensitive information input from an offline thread to an online thread in response to receiving the approval input.

18. The system of claim 16, further comprising computer-executable instructions that, when executed by the physical processor, cause the physical processor to request, via a graphical user interface displayed on a display device, the approval input.

19. A non-transitory computer-readable medium comprising one or more computer-executable instructions that, when executed by at least one processor of a computing device, cause the computing device to:
load, at the computing device, at least a portion of a webpage; and
perform a security action comprising:
converting, at the computing device, components of the webpage from an online status to an offline status;
receiving a sensitive information input to a respective offline component of the webpage;
converting, based on a stored user preference that indicates automatically converting an offline component to the online status in response to receiving the sensitive information input, the respective offline component to the online status;
buffering an outgoing network request comprising the sensitive information input;
receiving an approval input indicating approval to transmit potentially sensitive information to the Internet; and
releasing the outgoing network request in response to receiving the approval input.

20. The non-transitory computer-readable medium of claim 19, further comprising one or more computer-executable instructions that, when executed by at least one processor of the computing device, cause the computing device to pass the sensitive information input from an offline thread to an online thread in response to receiving the approval input.

* * * * *